UNITED STATES PATENT OFFICE.

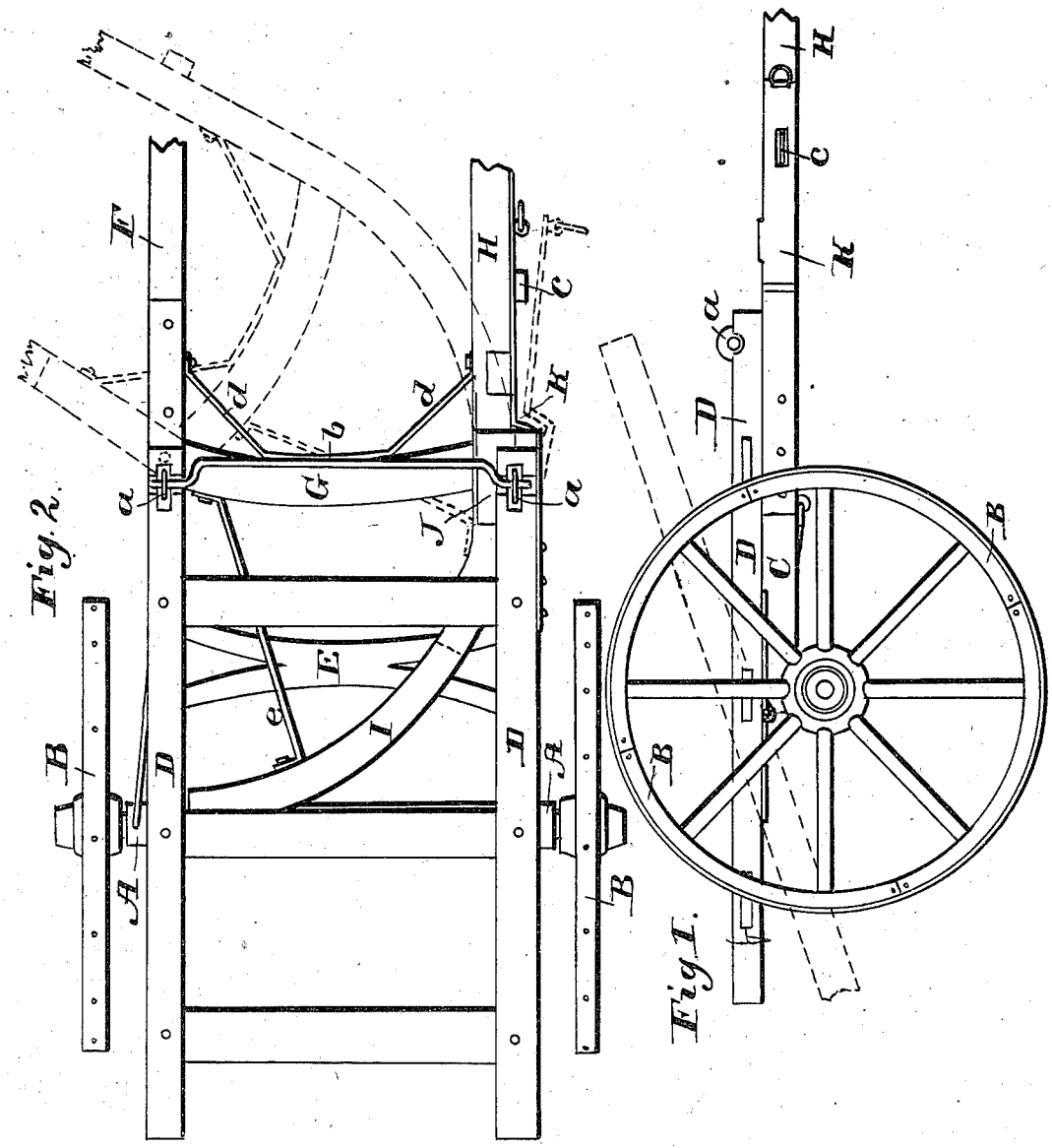

AUGUSTUS BEAN, OF FAIRVIEW VILLAGE, PENNSYLVANIA.

IMPROVEMENT IN SHAFTS FOR VEHICLES.

Specification forming part of Letters Patent No. 81,737, dated September 1, 1868.

*To all whom it may concern:*

Be it known that I, AUGUSTUS BEAN, of Fairview Village, in the county of Montgomery, and in the State of Pennsylvania, have invented certain new and useful Improvements in Shafts for Vehicles; and I do hereby declare that the following is a full, clear, and exact description thereof, reference being had to the accompanying drawings, and to the letters of reference marked thereon.

The nature of my invention consists in so arranging the shafts of a cart that the horse can be turned on the side the same as in wagons. This arrangement obviates the necessity of removing horses in carts from the curbstone after being backed up to unload coal or other matter which require the cart to be in that position, thereby blocking up the street.

In order to enable others skilled in the art to which my invention appertains to make and use the same, I will now proceed to describe its construction and operation, referring to the annexed drawings, which form a part of this specification, and in which—

Figure 1 is a side view, and Fig. 2 is a plan view.

A represents the axle with the wheels B B of an ordinary cart. On the axle A the two short shafts C C are secured, and on these the bed D of the cart rests, said bed being hinged at the rear end of the short shafts C C and held in position by staples $a\ a$, secured to the front ends of the shafts C C, and passing through slots in the front ends of the bed, a rod, $b$, being then passed through the staples, as shown in Fig. 2. By this arrangement the cart can be easily dumped when desired. A cross-brace, E, steadies the short shafts C C, as shown in Fig. 2.

To one of the short shafts C a shaft, F, is hinged, which shaft is connected by means of a cross-bar, G, with another shaft, H. This latter has a curved extension, I, to the rear, which slides in a guard, J, on the inner side of the other short shaft C. It will be seen that when the horse is hitched in the shafts F and G he can easily be turned to one side without unhitching, as the curved extension I slides in the guard J, and the shafts are without any trouble brought back to their proper position, where they are held by means of a spring, K, which spring is secured to the outer side of the shaft C and closes on a lug, $c$, on the shaft H.

Braces $d\ d$ from the cross-bar G to the shafts F and H steady the latter, and the curved extension I is steadied by a brace, $e$, connecting with the cross-piece G.

Having thus fully described my invention, what I claim as new, and desire to secure by Letters Patent, is—

1. The shaft H, provided with a curved extension, I, sliding under the bed of a cart in the guard J on the inner side of one of the short shafts C, and held in position by means of a spring, K, substantially as and for the purposes herein set forth.

2. The shaft F, hinged to one of the short shafts C, and connected by means of a cross-bar, G, to the shaft H, substantially as and for the purposes herein set forth.

3. The combination of the shafts F and H, when constructed and attached to a cart in the manner described, and operating substantially as and for the purposes herein set forth.

In testimony that I claim the foregoing I have hereunto set my hand this 17th day of July, 1868.

AUGUSTUS BEAN.

Witnesses:
   JNO. HOFFMAN,
   JAMES HOFFMAN.